US006863954B2

(12) United States Patent
Peiffer et al.

(10) Patent No.: US 6,863,954 B2
(45) Date of Patent: Mar. 8, 2005

(54) TRANSPARENT, SEALABLE, UV-RESISTANT POLYESTER FILM, ITS USE AND PROCESS FOR ITS PRODUCTION

(75) Inventors: Herbert Peiffer, Ingelheim (DE); Guenther Crass, Taunusstein (DE); Ulrich Kern, Ingelheim (DE); Ursula Murschall, Nierstein (DE); Andreas Stopp, Ingelheim (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 10/429,307

(22) Filed: May 5, 2003

(65) Prior Publication Data

US 2004/0067379 A1 Apr. 8, 2004

Related U.S. Application Data

(63) Continuation of application No. 09/779,151, filed on Feb. 8, 2001, now abandoned.

(30) Foreign Application Priority Data

Feb. 19, 2000 (DE) ........................................ 100 07 724

(51) Int. Cl.[7] ........................ B32B 27/08; B32B 27/20; B32B 27/36; B32B 31/330

(52) U.S. Cl. ....................... 428/141; 428/212; 428/213; 428/215; 428/216; 428/480; 428/910; 428/323; 428/331; 428/347; 428/349; 264/288.4; 264/290.2

(58) Field of Search ................................ 428/141, 212, 428/213, 215, 216, 480, 910, 323, 331, 347, 349; 264/288.4, 290.2

(56) References Cited

U.S. PATENT DOCUMENTS 4,375,494 A * 3/1983 Stokes ........................ 428/323
5,480,715 A * 1/1996 Mills et al. ................. 428/327
5,955,181 A * 9/1999 Peiffer et al. ............... 428/212
6,420,019 B1 * 7/2002 Peiffer et al. ............... 428/332

FOREIGN PATENT DOCUMENTS

| | | |
|---|---|---|
| EP | A 0 035 835 | 9/1981 |
| EP | A 0 432 886 | 8/1991 |
| EP | A 0 515 096 | 11/1992 |
| EP | 0 928 683 A2 | 7/1999 |
| GB | A 1 465 973 | 3/1977 |
| WO | WO 97/37849 A1 | 10/1997 |
| WO | WO 98/06575 | 2/1998 |

OTHER PUBLICATIONS

H. Day, D.M. Wiles: *J. Appl Polym Sci 16*, 1972, p. 203.

* cited by examiner

*Primary Examiner*—Vivian Chen
(74) *Attorney, Agent, or Firm*—ProPat, L.L.C.

(57) ABSTRACT

Biaxially oriented, coextruded polyester films with a base layer at least 90% by weight of which is composed of a thermoplastic polyester, preferably polyethylene terephthalate (PET), and with at least one sealable outer layer and a second nonsealable outer layer and, if desired, with other intermediate layers, and comprising at least one UV absorber, preferably hydroxybenzotriazoles and triazines, have high UV resistance, do not embrittle when exposed to high temperatures, have a surface without undesirable haze and are suitable for numerous indoor and outdoor applications. The outer layers comprise antiblocking agents, such as silica with an average particle diameter preferably below 50 nm and/or above 2 $\mu$m, and the sealable outer layer is preferably composed of a copolyester which has been built up from ethylene terephthalate units and ethylene isophthalate units.

22 Claims, No Drawings

TRANSPARENT, SEALABLE, UV-RESISTANT POLYESTER FILM, ITS USE AND PROCESS FOR ITS PRODUCTION

This application is a continuation of application Ser. No. 09/779,151 filed Feb. 8, 2001, abandoned.

The invention relates to a transparent, UV-resistant, sealable, biaxially oriented polyester film composed of at least one base layer B and, applied to both sides of this base layer, outer layers A and C. The film also comprises at least one UV stabilizer as light stabilizer. The invention further relates to the use of the film and to a process for its production.

BACKGROUND OF THE INVENTION

The novel films are particularly suitable for outdoor applications, e.g. for greenhouses or roofing systems. The films also have very good suitability for the covering of, and therefore for the protection of, metallic surfaces, onto which the films can be hot-sealed. In outdoor applications, films which comprise no UV-absorbing materials yellow, even after a short period, and their mechanical properties become impaired as a result of photooxidative degradation by sunlight.

Sealable, biaxially oriented polyester films are known in the prior art. Likewise known are sealable, biaxially oriented polyester films which have one or more UV absorbers. These films known from the prior art either have good sealing performance, good optical properties or acceptable processing performance.

GB-A 1 465 973 describes a coextruded polyester film having two layers, one layer of which consists of copolyesters containing isophthalic acid and terephthalic acid, and the other layer of which consists of polyethylene terephthalate. The patent gives no useful indication of the sealing performance of the film. The lack of pigmentation means that the film cannot be produced by a reliable process (cannot be wound up) and that the possibilities for further processing of the film are limited.

EP-A 0 035 835 describes a coextruded, sealable polyester film where, in the sealable layer, particles whose average size exceeds the sealable layer thickness are present in order to improve winding and processing performance. The particulate additives form surface protrusions which prevent undesired blocking and sticking of the film to rolls or guides. No further details are given concerning the incorporation of antiblocking agents in relation to the other, nonsealable layer of the film. It is uncertain whether this layer comprises antiblocking agents. The choice of particles having diameters greater than the sealable layer thickness, at the concentrations given in the Examples, impairs the sealing performance of the film. The patent does not give any indication of the sealing temperature range of the film. The seal seam strength is measured at 140° C. and is in the range from 63 to 120 N/m (from 0.97 N/15 mm to 1.8 N/15 mm of film width).

EP-A 0 432 886 describes a coextruded multilayer polyester film which has a first surface on which has been arranged a sealable layer, and has a second surface on which has been arranged an acrylate layer. The sealable outer layer here may also be composed of isophthalic-acid-containing and terephthalic-acid-containing copolyesters. The coating on the reverse side gives the film improved processing performance. The patent gives no indication of the sealing temperature range of the film. The seal seam strength is measured at 140° C. For a sealable layer thickness of 11 $\mu$m the seal seam strength given is 761.5 N/m (11.4 N/15 mm). A disadvantage of the reverse-side acrylate coating is that this side is now not sealable with respect to the sealable outer layer, and the film therefore has only very restricted use.

EP-A 0 515 096 describes a coextruded, multilayer film, sealable polyester film which comprises a further additive in the sealable layer. The additive may comprise inorganic particles, for example, and is preferably distributed in an aqueous layer onto the film during its production. Using this method, the film is claimed to retain its good sealing properties and to be easy to process. The reverse side comprises only very few particles, most of which pass into this layer via the recycled material. This patent again gives no indication of the sealing temperature range of the film. The seal seam strength is measured at 140° C. and is above 200 N/m (3 N/15 mm). For a sealable layer of 3 $\mu$m thickness the seal seam strength given is 275 N/m (4.125 N/15 mm).

WO 98/06575 describes a coextruded, multilayer polyester film which comprises a sealable outer layer and a nonsealable base layer. The base layer here may have been built up from one or more layers, and the inner layer of these layers is in contact with the sealable layer. The other (outward-facing) layer then forms the second nonsealable outer layer. Here, too, the sealable outer layer may be composed of isophthalic-acid-containing and terephthalic-acid-containing copolyesters, but these comprise no antiblocking particles. The film also comprises at least one UV absorber, which is added to the base layer in a weight ratio of from 0.1 to 10%. Preferred UV absorbers used here are triazines, e.g. â Tinuvin 1577 from Ciba. The base layer has conventional antiblocking agents. The film has good sealability, but does not have the desired processing performance and also has unsatisfactory optical properties, such as gloss and haze.

DESCRIPTION OF THE INVENTION

It was an object of the present invention to provide a transparent, UV-resistant, sealable and biaxially oriented polyester film which does not have the disadvantages of the films mentioned from the prior art and which, in particular, has a combination of advantageous properties, such as very good sealability, cost-effective production, improved processability and improved optical properties.

It was a particular object of the present invention to extend the sealing temperature range of the film to low temperatures, to increase the seal seam strength of the film and at the same time to provide for better handling of the film than is known from the prior art. The film should also give good processing, even on high-speed processing machinery. It should also be certain that during extrusion of the film it is possible to reintroduce recyclable material directly associated with its production at a concentration of up to 60% by weight, based on the total weight of the film, without any significant resulting adverse effect on the physical properties of the film.

Since the film is intended particularly for outdoor application and/or critical indoor applications, it should have high UV resistance. High UV resistance means that sunlight or other UV radiation causes no, or only extremely little, damage to the films. In particular, when used outdoors for a number of years, the films should show no yellowing, embrittlement or surface-cracking, and have unimpaired mechanical properties. High UV resistance means that the film absorbs the UV light and does not begin to transmit light until the visible region has been reached.

The good mechanical properties include a high modulus of elasticity (EMD>3200 N/mm2; ETD>3500 N/mm2), and also good tear strengths (in MD>100 N/mm2; in TD>130 N/mm2).

According to the invention, the object is achieved by providing a UV-resistant, biaxially oriented, sealable polyester film with at least one base layer B, with a sealable outer layer A, and with another outer layer C located on the other side of the base layer B, where the sealable outer layer A preferably has a minimum sealing temperature below 110° C. and a seal seam strength of at least 1.3 N/15 mm, and the film comprises at least one UV absorber or a mixture of various UV absorbers.

It is appropriate for the UV stabilizer to be fed directly as a masterbatch during film production, and the concentration of the UV stabilizer here is preferably from 0.01 to 5% by weight, based on the weight of the layers in which the UV absorber is present.

The film preferably has three layers, and the layers then present are the base layer B, the sealable outer layer A and the nonsealable outer layer C. The novel film may have additional intermediate layers.

The base layer B of the film is composed of a thermoplastic, and at least 90% by weight of the base layer is preferably composed of a thermoplastic polyester. Polyesters suitable for this purpose are those made from ethylene glycol and terephthalic acid (polyethylene terephthalate, PET), from ethylene glycol and naphthalene-2,6-dicarboxylic acid (polyethylene 2,6-naphthalate, PEN), from 1,4-bishydroxymethylcyclohexane and terephthalic acid (poly-1,4-cyclohexanedimethylene terephthalate, PCDT), or else made from ethylene glycol, naphthalene-2,6-dicarboxylic acid and biphenyl-4,4'-dicarboxylic acid (polyethylene 2,6-naphthalate bibenzoate, PENBB). Particular preference is given to polyesters at least 90 mol %, in particular at least 95 mol %, of which is composed of ethylene glycol units and terephthalic acid units, or of ethylene glycol units and naphthalene-2,6-dicarboxylic acid units. The remaining monomer units derive from other aliphatic, cycloaliphatic or aromatic diols and, respectively, dicarboxylic acids, as may also occur in the layers A and/or C.

Other examples of suitable aliphatic diols are diethylene glycol, triethylene glycol, aliphatic glycols of the formula HO—(CH2)n-OH, where n is an integer from 3 to 6 (in particular 1,3-propanediol, 1,4-butanediol, 1,5-pentanediol and 1,6-hexanediol) and branched aliphatic glycols having up to 6 carbon atoms. Among the cycloaliphatic diols, mention should be made of cyclohexanediols (in particular 1,4-cyclohexanediol). Examples of other suitable aromatic diols have the formula HO—C6H4-X—C6H4-OH, where X is —CH2-, —C(CH3)2-, —C(CF3)2-, —O—, —S— or —SO2-. Bisphenols of the formula HO—C6H4-C6H4-OH are also very suitable.

Other aromatic dicarboxylic acids are preferably benzenedicarboxylic acids, naphthalene dicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Among the cycloaliphatic dicarboxylic acids mention should be made of cyclohexanedicarboxylic acids (in particular cyclohexane-1,4-dicarboxylic acid). Among the aliphatic dicarboxylic acids, the C3–C19 alkanediacids are particularly suitable, and the alkane moiety here may be straight-chain or branched.

One way of preparing these polyesters according to the invention is the transesterification process. Here, the starting materials are dicarboxylic esters and diols, which are reacted using the customary transesterification catalysts, such as the salts of zinc, of calcium, of lithium, of magnesium or of manganese. The intermediates are then polycondensed in the presence of well known polycondensation catalysts, such as antimony trioxide or titanium salts. Another equally good preparation method is the direct esterification process in the presence of polycondensation catalysts. This starts directly from the dicarboxylic acids and the diols (W. Eberhard, S. Janocha, M. J. Hopper, K. J. Mackenzie, "Polyester Films", in Encyclopaedia of Polymer Science & Engineering Volume 12, 2, 193–216 (1988), John Wiley & Sons).

The sealable outer layer A applied by coextrusion to the base layer B has been built up on the basis of polyester copolymers and essentially consists of copolyesters composed predominantly of isophthalic acid units and of terephthalic acid units, and of ethylene glycol units. The remaining monomer units derive from other aliphatic, cycloaliphatic or aromatic diols and, respectively, dicarboxylic acids, as may also occur in the base layer. Preferred copolyesters are those which have been built up from ethylene terephthalate units and from ethylene isophthalate units. The proportion of ethylene terephthalate is preferably from 40 to 95 mol %, and the corresponding proportion of ethylene isophthalate is preferably from 60 to 5 mol %. Particular preference is given to copolyesters in which the proportion of ethylene terephthalate is from 50 to 90 mol % and the corresponding proportion of ethylene isophthalate is from 50 to 10 mol %, and very particular preference is given to copolyesters in which the proportion of ethylene terephthalate is from 60 to 85 mol % and the corresponding proportion of ethylene isophthalate is from 40 to 15 mol %.

For the other, nonsealable outer layer C, or for any intermediate layers present, use may in principle be made of the polymers described above for the base layer B.

The desired sealing and processing properties of the novel film are obtained from the combination of properties of the copolyester used for the sealable outer layer and from the topographies of the sealable outer layer A and the nonsealable outer layer C.

The minimum sealing temperature of preferably below 110° C. and the seal seam strength of preferably at least 1.3 N/15 mm are achieved when the copolymers described in more detail above are used for the sealable outer layer A. The films have their best sealing properties when no other additives, in particular no inorganic or organic fillers, are added to the copolymer. In this case, with the copolyester given above, the lowest minimum sealing temperature and the highest seal seam strengths are obtained. However, the handling of the film is poorer in this case, since the surface of the sealable outer layer A tends to block. The film can hardly be wound and has little suitability for further processing on high-speed packaging machinery. To improve handling of the film, and processability, it is necessary to modify the sealable outer layer A. This is best done with the aid of suitable antiblocking agents of a selected size, which are added to the sealable layer at a particular concentration, and specifically in such a way as to firstly minimize blocking and secondly give only insignificant impairment of sealing properties. This desired combination of properties can be achieved in particular when the topography of the sealable outer layer A is characterized by the following set of parameters:

The roughness of the sealable outer layer, characterized by the Ra value, should be less than 30 nm, otherwise the sealing properties are adversely affected for the purposes of the present invention.

The value measured for gas flow should be from 500–4000 s. At values below 500 s the sealing properties are adversely affected for the purposes of the present invention, and at values above 4000 s the handling of the film becomes poor.

For further improvement in the processing performance of the sealable film, the topography of the nonsealable outer layer C should be characterized by the following set of parameters:

The coefficient of friction (COF) of this side with respect to itself should be below 0.5, otherwise the winding performance and further processing of the film are unsatisfactory.

The roughness of the nonsealable outer layer, characterized by the Ra value, should be above 40 nm and below 100 nm. Values below 40 nm have an adverse effect on the winding and processing performance of the film, and values above 100 nm impair the optical properties (gloss, haze) of the film.

The value measured for gas flow should be below 120 s. At values above 120 s the winding and processing performance of the film is adversely affected.

The number of elevations N per mm2 of film surface has the following correlation with their respective heights h:

$$0.29-3.30\cdot\log h/\mu m<\log N/mm2<1.84-2.70\cdot\log h/\mu m\quad 0.01\ \mu m<h<10\ \mu m$$

If the values for N are below those corresponding to the left-hand side of the equation, the winding and processing performance of the film is adversely affected, and if the values for N are above those corresponding to the right-hand side of the equation, the gloss and haze of the film are adversely affected.

The UV stabilizers selected for rendering the novel film UV-resistant may in principle be any organic or inorganic UV stabilizer suitable for incorporation within polyesters. Suitable UV stabilizers of this type are known from the prior art and are described in more detail in WO 98/06575, in EP-A-0 006 686, in EP-A-0 031 202, EP-A-0 031 203 or in EP-A-0 076 582, for example.

Light, in particular the ultraviolet content of solar radiation, i.e. the wavelength region from 280 to 400 nm, causes degradation in thermoplastics, the results of which are not only a change in appearance due to color change or yellowing, but also an adverse effect on mechanical and physical properties.

The inhibition of this photooxidative degradation is of considerable industrial and economic importance, since without it many thermoplastics have drastically reduced scope of application.

The absorption of UV light by polyethylene terephthalates for example, starts at below 360 nm, increases markedly below 320 nm and is very pronounced at below 300 nm. Maximum absorption occurs at between 280 and 300 nm.

In the presence of oxygen it is mainly chain cleavage which occurs, but without crosslinking. The predominant photooxidation products in quantity terms are carbon monoxide, carbon dioxide and carboxylic acids. Besides the direct photolysis of the ester groups, consideration has to be given to oxidation reactions which proceed via peroxide radicals, again to form carbon dioxide.

In the photooxidation of polyethylene terephthalates there can also be cleavage of hydrogen at the position α to the ester groups, giving hydroperoxides and decomposition products of these, and this may be accompanied by chain cleavage (H. Day, D. M. Wiles: J. Appl. Polym. Sci 16, 1972, p. 203).

UV stabilizers, i.e. light stabilizers which are UV absorbers, are chemical compounds which can intervene in the physical and chemical processes of light-induced degradation. Carbon black and other pigments can give some protection from light. However, these substances are unsuitable for transparent films, since they cause discoloration or color change. The only compounds suitable for transparent, matt films are those organic or organometallic compounds which produce no, or only extremely slight, color or color change in the thermoplastic to be stabilized, i.e. are soluble in the thermoplastic.

For the purposes of the present invention, light stabilizers which are suitable UV stabilizers are those which absorb at least 70%, preferably 80%, particularly preferably 90%, of the UV light in the wavelength region from 180 to 380 nm, preferably from 280 to 350 nm. These are particularly suitable if they are thermally stable in the temperature range from 260 to 300° C., i.e. do not decompose and do not cause evolution of gas. Examples of light stabilizers which are suitable UV stabilizers are 2-hydroxybenzophenones, 2-hydroxybenzotriazoles, organonickel compounds, salicylic esters, cinnamic ester derivatives, resorcinol monobenzoates, oxanilides, hydroxybenzoates, sterically hindered amines and triazines, preferably the 2-hydroxybenzotriazoles and the triazines.

In one very particularly preferred embodiment, the novel film comprises from 0.01 to 5.0% by weight of 2-(4,6-diphenyl-1,3,5-triazin-2-yl)-5-hexyloxyphenol of the formula

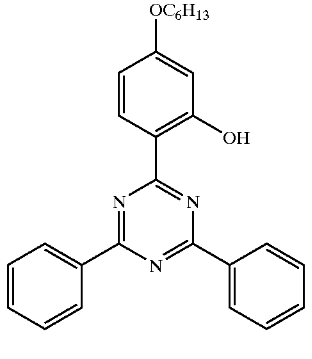

or from 0.01 to 5.0% by weight of 2,2-methylenebis(6-(2H-benzotriazol-2-yl)-4-(1,1,2,2-

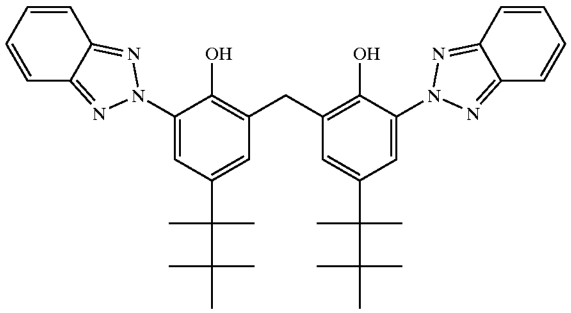

tetramethylpropyl)phenol) of the formula

In one preferred embodiment, it is also possible to use a mixture of these two UV stabilizers or a mixture of at least one of these two UV stabilizers with other UV stabilizers, and here the total concentration of light stabilizer is preferably from 0.01 to 5.0% by weight, based on the weight of polyethylene terephthalate.

In the three-layer embodiment, the UV stabilizer is preferably present in the nonsealable outer layer C. However, if required, the base layer B and/or the sealable outer layer A and/or, if desired, any intermediate layers present may also have UV stabilizers. The concentration of the stabilizer(s) here is based on the weight of the layers which have UV stabilizers.

Surprisingly, weathering tests to the test specification ISO 4892 using the Atlas Ci65 Weather-Ometer have shown that, to improve UV resistance, in the case of the abovementioned three-layer film it is fully sufficient for the outer layers of preferred thickness from 0.3 to 2.5 μm to have UV stabilizers.

Weathering tests have moreover shown that when films have been rendered UV-resistant according to the the invention they generally show no yellowing, no embrittlement, no loss of surface gloss, no surface-cracking and no impairment of mechanical properties even after an extrapolated 5 to 7 years of outdoor application in weathering tests.

It may be useful for the light stabilizer to be fed straightaway during preparation of the thermoplastic, or it may be fed into the extruder during film production.

It is particularly preferable for the light stabilizer to be added by way of masterbatch technology. The light stabilizer is dispersed in a solid carrier material. Carrier materials which may be used are the actual polyester used or else other polymers sufficiently compatible therewith.

An important factor in masterbatch technology is that the particle size and the bulk density of the masterbatch are similar to the particle size and bulk density of the polyester, enabling homogeneous dispersion and thus homogeneous UV stabilization.

The base layer B and any intermediate layers present may also comprise customary additives, such as stabilizers and/or antiblocking agents. The two other outer layers preferably also comprise customary additives, such as stabilizers and/or antiblocking agents. It is appropriate for these to be added to the polymer or, respectively, polymer mixture straight away prior to melting. Examples of stabilizers used are phosphorous compounds, such as phosphoric acid or phosphoric esters.

Suitable antiblocking agents (in this context also termed pigments) are inorganic and/or organic particles, such as calcium carbonate, amorphous silica, talc, magnesium carbonate, barium carbonate, calcium sulfate, barium sulfate, lithium phosphate, calcium phosphate, magnesium phosphate, aluminum oxide, LiF, the calcium, barium, zinc or manganese salts of the dicarboxylic acids used, carbon black, titanium dioxide, kaolin or crosslinked polystyrene particles or crosslinked acrylate particles.

The antiblocking agents selected may also be mixtures of two or more different antiblocking agents or mixtures of antiblocking agents of the same composition but different particle size. The particles may be added to the individual layers at the respective advantageous concentrations, e.g. as a glycolic dispersion during the polycondensation or by way of masterbatches during extrusion.

Preferred particles are SiO2 in colloidal or in chain form. These particles become very well bound into the polymer matrix and create only very few vacuoles. Vacuoles generally cause haze and it is therefore appropriate to avoid these. There is no restriction in principle on the diameters of the particles used. However, it has proven appropriate for achieving the object to use particles with an average primary particle diameter below 100 nm, preferably below 60 nm and particularly preferably below 50 nm, and/or particles with an average primary particle diameter above 1 μm, preferably above 1.5 μm and particularly preferably above 2 μm. However, the average particle diameter of these particles described last should not be above 5 μm.

To achieve the abovementioned properties of the sealable film, it has also proven to be appropriate to select a particle concentration in the base layer B which is lower than in the two outer layers A and C. In a three-layer film of the type mentioned the particle concentration in the base layer B will be from 0 to 0.15% by weight, preferably from 0 to 0.12% by weight and in particular from 0 to 0.10% by weight. There is no restriction in principle on the diameter of the particles used, but particular preference is given to particles with an average diameter above 1 μm.

In its advantageous usage form, the film is composed of three layers: the base layer B and, applied on both sides of this base layer, outer layers A and C, and outer layer A is sealable with respect to itself and with respect to outer layer C.

To achieve the property profile mentioned for the film, the outer layer C preferably has more pigment (i.e. a higher pigment concentration) than the outer layer A. The pigment concentration in this outer layer C is from 0.1 to 1.0% by weight, advantageously from 0.12 to 0.8% by weight and in particular from 0.15 to 0.6% by weight. In contrast, the other outer layer A, which is sealable and positioned opposite to the outer layer C, has a lower degree of filling with inert pigments. The concentration of the inert particles in layer A is from 0.01 to 0.2% by weight, preferably from 0.015 to 0.15% by weight and in particular from 0.02 to 0.1% by weight.

Between the base layer and the outer layers there may, if desired, also be intermediate layers, preferably one intermediate layer. This may again be composed of the polymers described for the base layers. In one particularly preferred embodiment, it is composed of the polyester used for the base layer. It may also comprise the additives described. The thickness of an intermediate layer is generally above 0.3 μm, preferably in the range from 0.5 to 15 μm, in particular in the range from 1.0 to 10 μm and very particularly preferably in the range from 1.0 to 5 μm.

In the particularly advantageous three-layer embodiment of the novel film, the thickness of the outer layers A and C is generally above 0.1 μm, and is generally in the range from 0.2 to 4.0 μm, advantageously in the range from 0.2 to 3.5 μm, in particular in the range from 0.3 to 3 μm and very particularly preferably in the range from 0.3 to 2.5 μm, and the thicknesses of the outer layers A and C may be identical or different.

The total thickness of the novel polyester film may vary within wide limits. It is preferably from 3 to 80 μm, in particular from 4 to 50 μm, particularly preferably from 5 to 30 μm, the layer B preferably making up from 5 to 90% of the total thickness.

In producing the film, it is appropriate for the polymers for the base layer B and the two outer layers A and C to be introduced separately to three extruders. Any foreign bodies or contamination present may be filtered out from the polymer melt prior to extrusion. The melts are then extruded through a coextrusion die to give flat melt films, and layered one upon the other. The multilayer film is then drawn off and solidified with the aid of a chill roll and, if desired, other rolls.

The invention therefore also provides a process for producing the novel polyester film by the coextrusion process known per se.

The procedure for this process is that the melts corresponding to the individual layers of the film are coextruded through a flat-film die, the resultant film is drawn off for solidification on one or more rolls, the film is then biaxially stretched (oriented), and the biaxially stretched film is heat-set and, if desired, corona- or flame-treated on the surface layer intended for treatment.

The biaxial stretching (orientation) is generally carried out sequentially, and preference is given to sequential biaxial stretching in which stretching is first longitudinal (in the machine direction) and then transverse (perpendicular to the machine direction).

As is usual in coextrusion, the polymer or the polymer mixture for the individual layers is first compressed and plasticized in an extruder, and the additives used may already be present in the polymer or the polymer mixture during this process. The melts are then simultaneously extruded through a flat-film die (slot die), and the extruded multilayer film is drawn off on one or more take-off rolls, whereupon it cools and solidifies.

The biaxial orientation is generally carried out sequentially, preferably orienting first longitudinally (i.e. in the machine direction=MD) and then transversely (i.e. perpendicularly to the machine direction=TD). This gives orientation of the molecular chains. The longitudinal orientation can be carried out with the aid of two rolls running at different speeds corresponding to the desired stretching ratio. For the transverse orientation use is generally made of an appropriate tenter frame.

The temperature at which the orientation is carried out may vary over a relatively wide range and depends on the film properties desired. The longitudinal stretching is generally carried out at from about 80 to 130° C., and the transverse stretching at from about 80 to 150° C. The longitudinal stretching ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1. Prior to the transverse stretching, one or both surfaces of the film may be in-line coated by known processes. The in-line coating may serve, for example, to give improved adhesion of a metal layer or of any printing ink applied, or else to improve antistatic performance or processing performance.

For producing a film with very good sealing properties it has proven advantageous for the planar orientation $\Delta p$ of the film to be equal to or less than 0.165, but particularly less than 0.163. In this case the strength of the film in the direction of its thickness is so great that when the seal seam strength is measured it is specifically the seal seam which separates, and the tear does not enter the film or propagate therein.

The significant variables affecting the planar orientation $\Delta p$ have been found to be the longitudinal and transverse stretching parameters, and also the SV (standard viscosity) of the raw material used. The processing parameters include in particular the longitudinal and transverse stretching ratios ($\lambda MD$ and $\lambda TD$), the longitudinal and transverse stretching temperatures (TMD and TTD), the film web speed and the nature of the stretching, in particular that in the longitudinal direction of the machine. For example, if the planar orientation $\Delta p$ obtained with a machine is 0.167 with the following set of parameters: $\lambda MD=4.8$ and $\lambda TD=4.0$, a longitudinal stretching temperature TMD of from 80–118° C. and a transverse stretching temperature TTD of from 80–125° C., then increasing the longitudinal stretching temperature TMD to 80–125° C. or increasing the transverse stretching temperature TTD to 80–135° C., or lowering the longitudinal stretching ratio $\lambda MD$ to 4.3 or lowering the transverse stretching ratio $\lambda TD$ to 3.7 gives a planar orientation $\Delta p$ within the desired range. The film web speed here is 340 m/min and the SV (standard viscosity) of the material is about 730. For the longitudinal stretching, the data mentioned are based on what is known as N-TEP stretching, composed of a low-orientation stretching step (LOE, Low Orientation Elongation) and a high-orientation stretching step (REP, Rapid Elongation Process). Other stretching systems in principle give the same ratios, but the numeric values for each process parameter may be slightly different. The temperatures given are based on the respective roll temperatures in the case of the longitudinal stretching and on infrared-measured film temperatures in the case of the transverse stretching.

In the heat-setting which follows, the film is held for from 0.1 to 10 s at a temperature of from about 150 to 250° C. The film is then wound up in a usual manner.

After the biaxial stretching it is preferable for one or both surfaces of the film to be corona- or flame-treated by one of the known methods. The intensity of the treatment generally gives a surface tension in the range above 45 mN/m.

The film may also be coated in order to achieve other desired properties. Typical coatings are layers with adhesion-promoting, antistatic, slip-improving or release action. These additional layers may, of course, be applied to the film by way of in-line coating, using aqueous dispersions, prior to the transverse stretching step.

The novel film has excellent sealability, very good UV resistance, very good handling properties and very good processing performance. The sealable outer layer A of the film seals not only with respect to itself (fin sealing) but also with respect to the nonsealable outer layer C (lap sealing). The minimum sealing temperature for the lap sealing here is only about 10° C. higher than the fin-sealing temperature, and the reduction in the seal seam strength is not more than 0.3 N/15 mm.

The gloss and haze of the film are also improved over films of the prior art. In producing the novel film it is certain that material for recycling can be refed to the extrusion process at a concentration of from 20 to 60% by weight, based on the total weight of the film, without any significant adverse effect on the physical properties of the film.

The excellent sealing properties, very good handling properties and very good processing properties of the film make it particularly suitable for processing on high-speed machinery.

A film of this type is therefore also cost-effective.

The excellent combination of properties possessed by the film, furthermore, makes it suitable for a wide variety of different applications, for example for interior decoration, for constructing exhibition stands, for exhibition requisites, for displays, for placards, for protective glazing of machines or of vehicles, in the lighting sector, in the fitting out of shops or of stores, or as a promotional requisite or laminating medium.

The good UV resistance of the novel, transparent film moreover makes it suitable for outdoor applications, e.g. for greenhouses, roofing systems, exterior cladding, protective coverings for materials, e.g. for steel sheet, applications in the building sector and illuminated advertising profiles.

The table below (Table 1) gives once again the most important film properties according to the invention.

TABLE 1

| | Range according to the invention | Preferred | Particularly preferred | Unit | Test method |
|---|---|---|---|---|---|
| Outer layer A | | | | | |
| Minimum sealing temperature | <110 | <105 | <100 | ° C. | internal |
| Seal seam strength | >1.3 | >1.5 | >1.8 | N/15 mm | internal |
| Average roughness Ra | <30 | <25 | <20 | nm | DIN 4768, cut-off 0.25 mm |
| Range of values for gas flow measurement | 500–4000 | 800–3500 | 1000–3000 | sec | internal |
| Gloss, 20° | >120 | >130 | >140 | | DIN 67 530 |
| Outer layer C | | | | | |
| COF | <0.5 | <0.45 | <0.40 | | DIN 53 375 |
| Average roughness Ra | 40–100 | 45–95 | 50–90 | nm | DIN 4768, cut-off 0.25 mm |
| Range of values for gas flow measurement | <120 | <100 | <80 | sec | internal |
| Gloss, 20° | >140 | >150 | >160 | | DIN 67 530 |
| Other film properties | | | | | |
| Haze | <4 | <3 | <2.5 | % | ASTM-D 1003-52 |
| Planar orientation | <0.165 | <0.163 | <0.160 | | internal |
| Weathering test, UV resistance Change in propertiesi) | <20% | | | | ISO 4892 |

i) The films were weathered both sides, in each case for 1000 hours per side, using the Atlas Ci 65 Weather-Ometer to the test specification ISO 4892, and then tested for mechanical properties, discoloration, surface defects, haze and gloss.

The following test methods were used to measure the properties of the raw materials and of the films:

DIN=Deutsches Institut für Normung

ISO=International Organization for Standardization

ASTM=American Society for Testing and Materials

SV (DCA), IV (DCA)

The standard viscosity SV (DCA) is measured in dichloroacetic acid by a method based on DIN 53726.

The intrinsic viscosity (IV) is calculated as follows from the standard viscosity IV (DCA)=6.67·10-4SV·(DCA)+0.118

Determination of Minimum Sealing Temperature

Hot-sealed specimens (seal seam 20 mm×100 mm) are produced with a Brugger HSG/ET sealing apparatus, by sealing the film at different temperatures with the aid of two heated sealing jaws at a sealing pressure of 2 bar and with a sealing time of 0.5 s. From the sealed specimens test strips of 15 mm width were cut. The T-seal seam strength was measured as in the determination of seal seam strength. The minimum sealing temperature is the temperature at which a seal seam strength of at least 0.5 N/15 mm is achieved.

Seal Seam Strength

To determine the seal seam strength, two film strips of width 15 mm were placed one on top of the other and sealed at 130° C. with a sealing time of 0.5 s and a sealing pressure of 2 bar (apparatus: Brugger model NDS, single-side-heated sealing jaw). The seal seam strength was determined by the T-peel method.

Coefficient of Friction

The coefficient of friction was determined to DIN 53 375. The coefficient of sliding friction was measured 14 days after production.

Surface Tension

Surface tension was determined by what is known as the ink method (DIN 53 364).

Haze

The Hölz haze was measured by a method based on ASTM-D 1003-52 but, in order to utilize the most effective measurement range, measurements were made on four pieces of film laid one on top of the other, and a 1° slit diaphragm was used instead of a 4° pinhole.

Gloss

Gloss was determined to DIN 67 530. The reflectance was measured as an optical value characteristic of a film surface. Based on the standards ASTM-D 523-78 and ISO 2813, the angle of incidence was set at 20°. A beam of light hits the flat test surface at the set angle of incidence and is reflected and/or scattered thereby. A proportional electrical variable is displayed representing light rays hitting the photoelectronic detector. The value measured is dimensionless and must be stated together with the angle of incidence.

Determination of Particle Sizes on Film Surfaces

A scanning electron microscope and an image analysis system were used to determine the size distribution of elevations on film surfaces. Use is made of the XL30 CP scanning electron microscope from Philips with an integrated image analysis program: AnalySIS from Soft-Imaging System.

For these measurements, specimens of film are placed flat on a specimen holder. These are then metalized obliquely at an angle "a" with a thin metallic layer (e.g. of silver). The symbol "a" here is the angle between the surface of the specimen and the direction of diffusion of the metal vapor. This oblique metalization throws a shadow behind the elevation. Since the shadows are not at this stage electrically conductive, the specimen is then further spotted or metalized with a second metal (e.g. gold), the second coating here impacting vertically onto the surface of the specimen in such a way as not to produce any shadows in the second coating.

Scanning electron microscope (SEM) images are taken of the specimen surfaces prepared in this way. The shadows of the elevations are visible because of the contrast of the metallic materials. The specimen is oriented in the SEM in such as way that the shadows run parallel to one edge of the image. The following conditions are set in the SEM for recording the image: secondary electron detector, operating distance 10 mm, acceleration voltage 10 kV and spot 4.5. The brightness and contrast are set in such a way that all of the information in the image is represented as gray values and the intensity of the background noise is sufficiently small for it not to be detected as a shadow. The length of the shadows is measured by image analysis. The threshold value for shadow identification is set at the point where the second derivative of the gray value distribution of the image passes through the zero point. Before shadow identification, the image is smoothed with an N×N filter (size 3, 1 iteration). A frame is set so as to ensure that elevations which are not reproduced in their entirety in the image are not included in the measurements. The magnification, the size of the frame and the number of images evaluated are selected in such a way that a total film surface of 0.36 mm2 is evaluated.

The height of the individual elevations is computed from the individual shadow lengths using the following relationship:

$$h=(\tan a)^{*}L$$

where h is the height of the elevation, a is the metalization angle and L is the shadow length. The elevations recorded in this way are classified so as to arrive at a frequency distribution. The classification is into classes of 0.05 μm width between 0 and 1 μm, the smallest class (from 0 to 0.05 μm) not being used for further evaluation calculations. The diameters (dimension perpendicular to the direction of shadow throw) of the elevations are classified in a similar way in classes of 0.2 μm width from 0 to 10 μm, and here again the smallest class is not used for further evaluation.

Surface Gas Flow Time

The principle of the test method is based on the air flow between one side of the film and a smooth silicon wafer sheet. The air flows from the surroundings into an evacuated space, and the interface between film and silicon wafer sheet acts as a flow resistance.

A round specimen of film is placed on a silicon wafer sheet in the middle of which there is a hole providing the connection to the receiver. The receiver is evacuated to a pressure below 0.1 mbar. The time in seconds taken by the air to establish a pressure rise of 56 mbar in the receiver is determined.

Test Conditions

| | | |
|---|---|---|
| Test area | 45.1 | cm2 |
| Weight applied | 1276 | g |
| Air temperature | 23° | C. |
| Humidity | 50% | relative humidity |
| Aggregated gas volume | 1.2 | cm3 |
| Pressure difference | 56 | mbar |

Determination of Planar Orientation Δp

Planar orientation is determined by measuring the refractive index with an Abbe refractometer.

Preparation of Specimens

Specimen size and length: from 60 to 100 mm

Specimen width: corresponds to prism width of 10 mm

To determine nMD and na (=nz), the specimen to be tested has to be cut out from the film with the running edge of the specimen running precisely in the direction TD. To determine nMD and na (=nz), the specimen to be tested has to be cut out from the film with the running edge of the specimen running precisely in the direction MD. The specimens are to be taken from the middle of the film web. Care must be taken that the temperature of the Abbe refractometer is 23° C. Using a glass rod, a little diiodomethane (N=1.745) or diiodomethane-bromonaphthalene mixture is applied to the lower prism, which has been cleaned thoroughly before the test. The refractive index of the mixture must be greater than 1.685. The specimen cut out in the direction TD is firstly laid on top of this, in such a way that the entire surface of the prism is covered. Using a paper wipe, the film is now firmly pressed flat onto the prism, so that it is firmly and smoothly positioned thereon. The excess liquid must be sucked away. A little of the test liquid is then dropped onto the film. The second prism is swung down and into place and pressed firmly into contact. The right-hand knurled screw is then used to turn the indicator scale until a transition from light to dark can be seen in the field of view in the range from 1.62 to 1.68. If the transition from light to dark is not sharp, the colors are brought together using the upper knurled screw in such a way that only one light and one dark zone are visible. The sharp transition line is brought to the crossing point of the two diagonal lines (in the eyepiece) using the lower knurled screw. The value now indicated on the measurement scale is read off and entered into the test record. This is the refractive index nMD in the machine direction. The scale is now turned using the lower knurled screw until the range visible in the eyepiece is from 1.49 to 1.50. The refractive index na or nz (in the direction of the thickness of the film) is then determined. To improve the visibility of the transition, which is only weakly visible, a polarization film is placed over the eyepiece. This is turned until the transition is clearly visible. The same considerations apply as in the determination of nMD. If the transition from light to dark is not sharp (colored), the colors are brought together using the upper knurled screw in such a way that a sharp transition can be seen. This sharp transition line is placed on the crossing point of the two diagonal lines using the lower knurled screw, and the value indicated on the scale is read off and entered into the table. The specimen is then turned, and the corresponding refractive indices nMD and na (=nz) of the other side are measured and entered into an appropriate table. After determining the refractive indices in, respectively, the direction MD and the direction of the thickness of the film, the specimen strip cut out in the direction MD is placed in position and the refractive indices nTD and na (=nz) are determined accordingly. The strip is turned over, and the values for the B side are measured. The values for the A side and the B side are combined to give average refractive indices. The orientation values are then calculated from the refractive indices using the following formulae:

$$\Delta n = nMD - nTD$$

$$\Delta p = (nMD + nTD)/2 - nz$$

$$nav = (nMD + nTD + nz)/3$$

Surface Defects

Surface defects are determined visually.

Mechanical Properties

Modulus of elasticity, tear strength and elongation at break are measured longitudinally and transversely to ISO 527-1-2.

Weathering (on Both Sides), UV Resistance

UV resistance is tested as follows to the test specification ISO 4892

| | |
|---|---|
| Test apparatus: | Atlas Ci 65 Weather-Ometer |
| Test conditions: | ISO 4892, i.e. artificial weathering |
| Irradiation time: | 1000 hours (per side) |
| Irradiation: | 0.5 W/m2, 340 nm |
| Temperature: | 63° C. |
| Relative humidity: | 50% |
| Xenon lamp: | inner and outer filter made from borosilicate |
| Irradiation cycles: | 102 minutes of UV light, then 18 minutes of UV light with water spray on the specimens, then again 102 minutes of UV light, etc. |

Color Change

The change in color of the specimens after artificial weathering is measured using a spectrophotometer to DIN 5033.

The greater the numerical deviation from standard, the greater the color difference. Numerical values of <0.3 can be neglected and indicate that there is no significant color change.

Yellowness

The Yellowness Index YID is the deviation from the colorless condition in the "yellow" direction, and is measured to DIN 6167. Yellowness values (YID) <5 are not visually detectable.

EXAMPLE 1

Chips made from polyethylene terephthalate (prepared by the transesterification process with Mn as transesterification catalyst, Mn concentration: 100 ppm) were dried at 150° C. to residual moisture below 100 ppm and, together with the stated masterbatches, fed to the extruder for the base layer B. Chips made from polyethylene terephthalate were likewise fed, together with the masterbatches stated, to the extruder for the nonsealable outer layer C.

Alongside this, chips were prepared made from a linear polyester which is composed of an amorphous copolyester with 78 mol % of ethylene terephthalate and 22 mol % of ethylene isophthalate (prepared via the transesterification process with Mn as transesterification catalyst, Mn concentration: 100 ppm). The copolyester was dried at a temperature of 100° C. to a residual moisture below 200 ppm and, together with the masterbatches stated, fed to the extruder for the sealable outer layer A.

The UV stabilizer 2-(4,6-diphenyl-1,3,5-triazin-2-yl)-5-hexyloxyphenol (®Tinuvin 1577) is fed in the form of masterbatches. The masterbatches are composed of 5% by weight of Tinuvin 1577 as active component and 95% by weight of polyethylene terephthalate (for outer layer C) and, respectively, 95% by weight of polyethylene isophthalate (for outer layer A). The masterbatches with 5% by weight of Tinuvin 1577 are fed only to the two thick outer layers at 20% by weight via masterbatch technology.

The masterbatch is charged at room temperature from a separate metering vessel into a vacuum dryer, which from the time of charging to the end of the residence time passes through a temperature profile of from 25 to 130° C. During the residence time of about 4 hours, the masterbatch is stirred at 61 rpm. The precrystallized or predried masterbatch is after-dried in the downstream hopper, likewise in vacuo, at 140° C. for 4 hours.

Coextrusion, followed by stepwise longitudinal and transverse orientation, is used to produce a transparent three-layer film with ABC structure and with a total thickness of 12 μm. The thickness of each outer layer can be found in Table 2.

Outer Layer A is a Mixture Made from 20.0% by weight of UV masterbatch based on polyethylene isophthalate 77.0% by weight of copolyester with an SV of 800

3.0% by weight of masterbatch made from 97.75% by weight of copolyester (SV of 800) and 1.0% by weight of ®Sylobloc 44 H (synthetic SiO2 from Grace) and 1.25% by weight of ®Aerosil TT 600 (chain-type SiO2 from Degussa)

Base layer B

100% by weight of polyethylene terephthalate with an SV of 800

Outer Layer C is a Mixture Made from 20.0% by weight of UV masterbatch based on polyethylene terephthalate 68% by weight of polyethylene terephthalate with an SV of 800

12% by weight of masterbatch made from 97.75% by weight of copolyester (SV of 800) and 1.0% by weight of ®Sylobloc 44 H (synthetic SiO2 from Grace) and 1.25% by weight of ®Aerosil TT 600 (chain-type SiO2 from Degussa)

The production conditions in the individual steps of the process were:

| | | | |
|---|---|---|---|
| Extrusion: | Temperatures | | |
| | A layer: | 270° C. | |
| | B layer: | 290° C. | |
| | C layer: | 290° C. | |
| | Die gap width: | 2.5 mm | |
| | Take-off roll | | |
| | Temperature: | 30° C. | |
| Longitudinal stretching: | Temperature: | 80–125° C. | |
| | Longitudinal stretching ratio: | 4.2 | |
| Transverse stretching: | Temperature: | 80–135° C. | |
| | Transverse stretching ratio: | 4.0 | |
| Heat-setting: | Temperature: | 230° C. | |
| Duration: | | 3 s | |

The film had the required good sealing properties and exhibits the desired handling properties and the desired processing performance. The film structure and the properties achieved in films prepared in this way are given in Tables 2 and 3 (CE=Comparative Example).

The films in this example, and in all of the examples below, were weathered on both sides, in each case for 1000 hours per side, using the Atlas Ci 65 Weather-Ometer to test specification ISO 4892 and then tested for mechanical properties, discoloration, surface defects, haze and gloss (cf. Table 4).

EXAMPLE 2

In comparison with Example 1, the outer layer thickness of the sealable layer A was raised from 1.5 to 2.0 μm. This has given improved sealing properties, and in particular the seal seam strength has increased markedly.

EXAMPLE 3

In comparison with Example 1, the film produced now had a thickness of 20 µm. The outer layer thickness for the sealable layer A was 2.5 µm and that for the nonsealable layer C was 2.0 µm. This has again improved sealing properties, and in particular the seal seam strength has increased markedly, and the handling properties of the film have improved slightly.

EXAMPLE 4

In comparison with Example 3, the copolymer for the sealable outer layer A has been changed. Instead of the amorphous copolyester with 78 mol % of ethylene terephthalate and 22 mol % of ethylene isophthalate, use was now made of an amorphous copolyester with 70 mol % of ethylene terephthalate and 30 mol % of ethylene isophthalate. The polymer was processed in a twin-screw vented extruder, without any need for predrying. The outer layer thickness for the sealable layer A was again 2.5 µm, and that for the nonsealable layer C was 2.0 µm. This has given improved sealing properties, and in particular the seal seam strength has increased markedly. To achieve good handling properties and good processing performance from the film, the pigment concentration in the two outer layers was raised slightly.

COMPARATIVE EXAMPLE 1

In comparison with Example 1, the sealable outer layer A was now not pigmented. Although this has given some improvement in the sealing properties, the handling properties of the film and its processing performance have worsened markedly.

COMPARATIVE EXAMPLE 2

In comparison with Example 1, the level of pigmentation in the sealable outer layer A was now as high as in the nonsealable outer layer C. This measure has improved the handling properties and the processing properties of the film, but the sealing properties have worsened markedly.

COMPARATIVE EXAMPLE 3

In comparison with Example 1, the nonsealable outer layer C was now pigmented to a markedly lower level. The handling properties of the film and its processing performance have worsened markedly.

COMPARATIVE EXAMPLE 4

Example 1 from EP-A 0 035 835 was repeated. The sealing performance of the film, its handling properties and its processing performance are markedly poorer than in the examples according to the invention.

TABLE 2

| Example | Film thickness µm | Film structure | Layer thickness µm A | B | C | Pigments in layers A | B | C | Average pigment diameter in layers mm A | B | C | Pigment concentrations ppm (parts by weight) A | B | C |
|---|---|---|---|---|---|---|---|---|---|---|---|---|---|---|
| E1 | 12 | ABC | 1.5 | 9 | 1.5 | Sylobloc 44 H | none | Sylobloc 44 H | 2.5 | | 2.5 | 300 | 0 | 1200 |
| | | | | | | Aerosil TT 600 | | Aerosil TT 600 | 0.04 | | 0.04 | 375 | | 1500 |
| E2 | 12 | ABC | 2.0 | 8.5 | 1.5 | Sylobloc 44 H | none | Sylobloc 44 H | 2.5 | | 2.5 | 300 | 0 | 1200 |
| | | | | | | Aerosil TT 600 | | Aerosil TT 600 | 0.04 | | 0.04 | 375 | | 1500 |
| E3 | 20 | ABC | 2.5 | 15.5 | 2.0 | Sylobloc 44 H | none | Sylobloc 44 H | 2.5 | | 2.5 | 300 | 0 | 1200 |
| | | | | | | Aerosil TT 600 | | Aerosil TT 600 | 0.04 | | 0.04 | 375 | | 1500 |
| E4 | 20 | ABC | 2.5 | 15.5 | 2.0 | Sylobloc 44 H | none | Sylobloc 44 H | 2.5 | | 2.5 | 400 | 0 | 1500 |
| | | | | | | Aerosil TT 600 | | Aerosil TT 600 | 0.04 | | 0.04 | 500 | | 1875 |
| CE 1 | 12 | ABC | 1.5 | 9 | 1.5 | none | none | Sylobloc 44 H | | | 2.5 | | 0 | 1200 |
| | | | | | | | | Aerosil TT 600 | | | 0.04 | | | 1500 |
| CE 2 | 12 | ABC | 1.5 | 9 | 1.5 | Sylobloc 44 H | none | Sylobloc 44 H | 2.5 | | 2.5 | 300 | 0 | 1200 |
| | | | | | | Aerosil TT 600 | | Aerosil TT 600 | 0.04 | | 0.04 | 375 | | 1500 |
| CE 3 | 12 | ABC | 1.5 | 9 | 1.5 | Sylobloc 44 H | none | Sylobloc 44 H | 2.5 | | 2.5 | 300 | 0 | 600 |
| | | | | | | Aerosil TT 600 | | Aerosil TT 600 | 0.04 | | 0.04 | 375 | | 750 |
| CE 4 | 15 | AB | 2.25 | 12.75 | | Gasil 35 | none | | 3 | | | 2500 | 0 | |
| | | | | | | EP-A 035 835 | | | | | | | | |

TABLE 3

| Example | Minimum sealing temperature ° C. A side with respect to A side | Seal seam strength n/15 mm A side with respect to A side | Coefficient of friction COF C side with respect to C side | Average roughness Ra nm A side | C side | Values measured for gas flow sec A side | C side | Constants A/B A side | C side | Dp | Gloss 20° A side | C side | Haze | Winding performance and handling properties | Processing performance |
|---|---|---|---|---|---|---|---|---|---|---|---|---|---|---|---|
| E1 | 100 | 2.0 | 0.45 | 25 | 65 | 1200 | 80 | 0.5 | 3.06 | 0.165 | 140 | 170 | 2.5 | ++ | ++ |
| E2 | 98 | 2.7 | 0.45 | 26 | 65 | 1280 | 80 | 0.5 | 3.06 | 0.165 | 140 | 170 | 2.5 | ++ | ++ |
| E3 | 95 | 3.0 | 0.41 | 23 | 61 | 1110 | 80 | 0.5 | 3.06 | 0.165 | 130 | 170 | 3.0 | ++ | ++ |
| E4 | 85 | 3.3 | 0.40 | 23 | 65 | 1300 | 60 | 0.5 | 3.06 | 0.165 | 130 | 170 | 3.0 | ++ | ++ |
| CE1 | 98 | 2.1 | 0.45 | 10 | 65 | 10,000 | 80 | | | 0.165 | 160 | 170 | 1.5 | – | – |

TABLE 3-continued

| Ex-<br>am-<br>ple | Minimum sealing temperature ° C. A side with respect to A side | Seal seam strength n/15 mm A side with respect to A side | Coefficient of friction COF C side with respect to C side | Average roughness Ra nm A side | C side | Values measured for gas flow sec A side | C side | Constants A/B A side | C side | Dp | Gloss 20° A side | C side | Haze | Winding performance and handling properties | Processing performance |
|---|---|---|---|---|---|---|---|---|---|---|---|---|---|---|---|
| CE2 | 110 | 1.0 | 0.45 | 65 | 65 | 80 | 80 | | | 0.165 | 130 | 170 | 2.8 | – | – |
| CE3 | 100 | 2.0 | 0.45 | 25 | 37 | 1200 | 150 | | | 0.165 | 160 | 190 | 1.5 | – | – |
| CE4 | 115 | 0.97 | >2 | 70 | 20 | 50 | >500<br>0 | | | | | | 12 | – | – |

Key to winding performance, handling properties and processing performance of films:
++: no tendency to adhere to rolls or to other mechanical parts, no blocking problems on winding or during processing on packaging machinery, low production costs
–: tendency to adhere to rolls or other mechanical parts, blocking problems on winding and during processing on packaging machinery, high production costs due to complicated handling of film in machinery

TABLE 4

| Ex-<br>am-<br>ple | Weathering | Modulus of elasticity N/mm2 longitudinal | transverse | Tear strength N/mm2 longitudinal | transverse | Elongation at break % longitudinal | transverse | Total discoloration value | Surface defects | Gloss A side | C side | Haze |
|---|---|---|---|---|---|---|---|---|---|---|---|---|
| E1 | Before | 4300 | 5800 | 220 | 280 | 170 | 100 | 0.2 | none | 140 | 170 | 2.5 |
| | After | 4100 | 5480 | 190 | 270 | 150 | 90 | | | 132 | 165 | 2.5 |
| E2 | Before | 4200 | 5600 | 215 | 260 | 170 | 100 | 0.25 | none | 140 | 170 | 2.5 |
| | After | 4030 | 5400 | 190 | 250 | 150 | 90 | | | 138 | 165 | 2.8 |
| E3 | Before | 4500 | 5700 | 230 | 280 | 175 | 105 | 0.24 | none | 130 | 170 | 3.0 |
| | After | 4000 | 5350 | 196 | 255 | 150 | 89 | | | 138 | 155 | 3.7 |
| E4 | Before | 4300 | 5800 | 220 | 275 | 178 | 111 | 0.27 | none | 130 | 170 | 3.0 |
| | After | 3900 | 5360 | 192 | 248 | 148 | 92 | | | 138 | 165 | 3.5 |

What is claimed is:

1. A polyester film which has a base layer B made from a thermoplastic polyester and which are one side of the base layer, has a scalable outer layer A and, located on the other side of the base layer, has a nonsealable outer layer C, and one or more optional intermediate layers where the outer layers A and C comprise at least one antiblocking agent, and the film comprises at least one UV absorber, wherein outer layer A has a gloss at 20° of >120; outer layer C has a gloss at 20° of >140; and said, film has a haze <4, said outer layer C comprising a greater amount of antiblocking agent than outer layer A.

2. The polyester film as claimed in claim 1, further comprising one or more intermediate layers arranged between the base layer B and the outer layer A or between the base layer B and the outer layer C or between the base layer B and the outer layer A and between base layer B and outer layer C.

3. The polyester film as claimed in claim 1, wherein at least 90% by weight of the base layer comprises polyethylene terephthalate or polyethylene-2,6-naphthalate.

4. The polyester film as claimed in claim 1, wherein the outer layer A comprises a copolyester which is predominantly composed of isophthalic acid units, terephthalic acid units and ethylene glycol units.

5. The polyester film as claimed in claim 4, wherein from 40 to 95 mol %, of the copolyester of outer layer A is composed of ethylene terephthalate units, and the remainder making up 100 mol % is composed of ethylene isophthalate units.

6. The polyester as claimed in claim 1, wherein the base layer B comprises no antiblocking agents, or the concentration of antiblocking agent in the base layer B is lower than in the outer layer. A and C.

7. The polyester as claimed in claim 6, wherein the concentration of antiblocking agent in the base layer 13 is from 0–0.15% by weight, in the outer layer C from 0.1–1% by weight and from 0.01–0.2% by weight in the outer layer A.

8. The polyester film as claimed in claim 1, wherein the average particle diameter of the antiblocking agents is below 100 nm and/or above 1 $\mu$m.

9. The polyester film as claimed in claim 1, wherein $SiO_2$ is used as antiblocking agent.

10. The polyester film as claimed in claim 1, wherein the thickness of the outer layers is identical or different and is from 0.2 to 4.0 $\mu$m.

11. The polyester film as claimed in claim 1, wherein the UV absorber is present in the base layer and/or in the outer layers.

12. The polyester film as claimed in claim 1, wherein the UV absorber comprises 2-hydroxybenzotriazoles or triazines or mixtures of these UV absorbers.

13. The polyester film as claimed in claim 12, wherein the UV absorber comprises 2-(4,6-diphenyl-1,3,5-triazin-2-yl)-5-hexyloxyphenol or 2,2-methylenebis(6-(2H-benzotriazol-2-yl)-4-(1,1,2,2-tetramethylpropyl)phenol) or a mixture of these UV absorbers.

14. The polyester film as claimed in claim 1, wherein the concentration of the UV absorber(s) is from 0.01–5% by weight, based on the weight of the layers in which they are present.

15. A process for producing a polyester film as claimed in claim 1, which comprises coextruding, through a coextrusion die, the starting materials required for producing the base and outer layers, and biaxially orienting and heat-setting, the resultant film.

16. The process as claimed in claim 15, wherein the UV absorber is added by way of masterbatch technology.

17. A polyester film according to claim 1, wherein the base layer B comprises no antiblocking agent and the concentration of antiblocking agent in the outer layer C is from 0.1–1% by weight and the concentration of antiblocking agent in the outer layer A is from 0.01–0.2% by weight.

18. A polyester film according to claim 1, wherein the sealable cuter layer A has a minimum sealing temperature of 100° C. and a seal seam strength of at least 1.3 N/15 mm.

19. A polyester film according to claim 1, wherein the sealable outer layer A exhibits a value for Ra <30 nm and a value measured for gas flow of 500 to 4000 s and the outer layer C exhibits a value for Ra that is greater than 40 nm and less than 100 nm and a value measured for gas flow of less than 120 s.

20. A polyester film according to claim 1, wherein said UV absorber is present only in said outer layers A and C.

21. A polyester film according to claim 1, wherein said UV absorber is present only in said outer layers A and C, said outer layer thicknesses ranging from 0.3 to 2.5 micron, wherein said polyester film fulfills weathering test specification ISO 4892.

22. A polyester film according to claim 1, said film containing from 20 to 60% by weight of recycle formed from said film.

* * * * *